United States Patent [19]

Lindahl et al.

[11] Patent Number: 4,883,599
[45] Date of Patent: Nov. 28, 1989

[54] METHOD FOR CLEANSING METAL-CONTAINING SOLUTIONS

[76] Inventors: Erik Lindahl, Appelboms väg 14, S-186 00 Vallentuna; Gunnar Hovsenius, Tunavägen 32, S-194 51 Upplands Väsby, both of Sweden

[21] Appl. No.: 204,176

[22] PCT Filed: Oct. 8, 1987

[86] PCT No.: PCT/SE87/00454
§ 371 Date: Jun. 6, 1988
§ 102(e) Date: Jun. 6, 1988

[87] PCT Pub. No.: WO88/02738
PCT Pub. Date: Apr. 21, 1988

[30] Foreign Application Priority Data

Oct. 16, 1986 [SE] Sweden .................... 8604404

[51] Int. Cl.⁴ .................................... C02F 1/42
[52] U.S. Cl. ........................... 210/670; 210/684; 210/688
[58] Field of Search ............ 210/665, 670, 679, 688, 210/282, 284, 684

[56] References Cited

U.S. PATENT DOCUMENTS 3,755,161 8/1973 Yokota et al. ............... 210/679
4,752,398 6/1988 Holbein et al. ............. 210/688

Primary Examiner—Ivars Cintins
Attorney, Agent, or Firm—Nies, Webner, Kurz & Bergert

[57] ABSTRACT

A method for cleansing metal-containing solutions, particularly, but not exclusively, process water which contains such metals as mercury, cadmium and/or lead, where the metals concerned are present in water-soluble form, such as the form of a chloride complex. The method is characterized by passing the solution through an ion-exchange material (4) which consists essentially of sulfhydrated cellulose, the metals being adsorbed in the sulfhydrated cellulose; regenerating the ion-exchange material (4) subsequent to the adsorption of a predetermined quantity of metal, by rinsing the ion-exchange material with an aqueous solution that contains hydrochloric acid (HCl) at a concentration of at least about 1 molar HCl; and precipitating the metals concerned in sulphide form, in a known manner, from the liquid that is eluted from the ion-exchange material (4) in the aforementioned rinsing process.

The invention also relates to apparatus for carrying out the method.

6 Claims, 1 Drawing Sheet

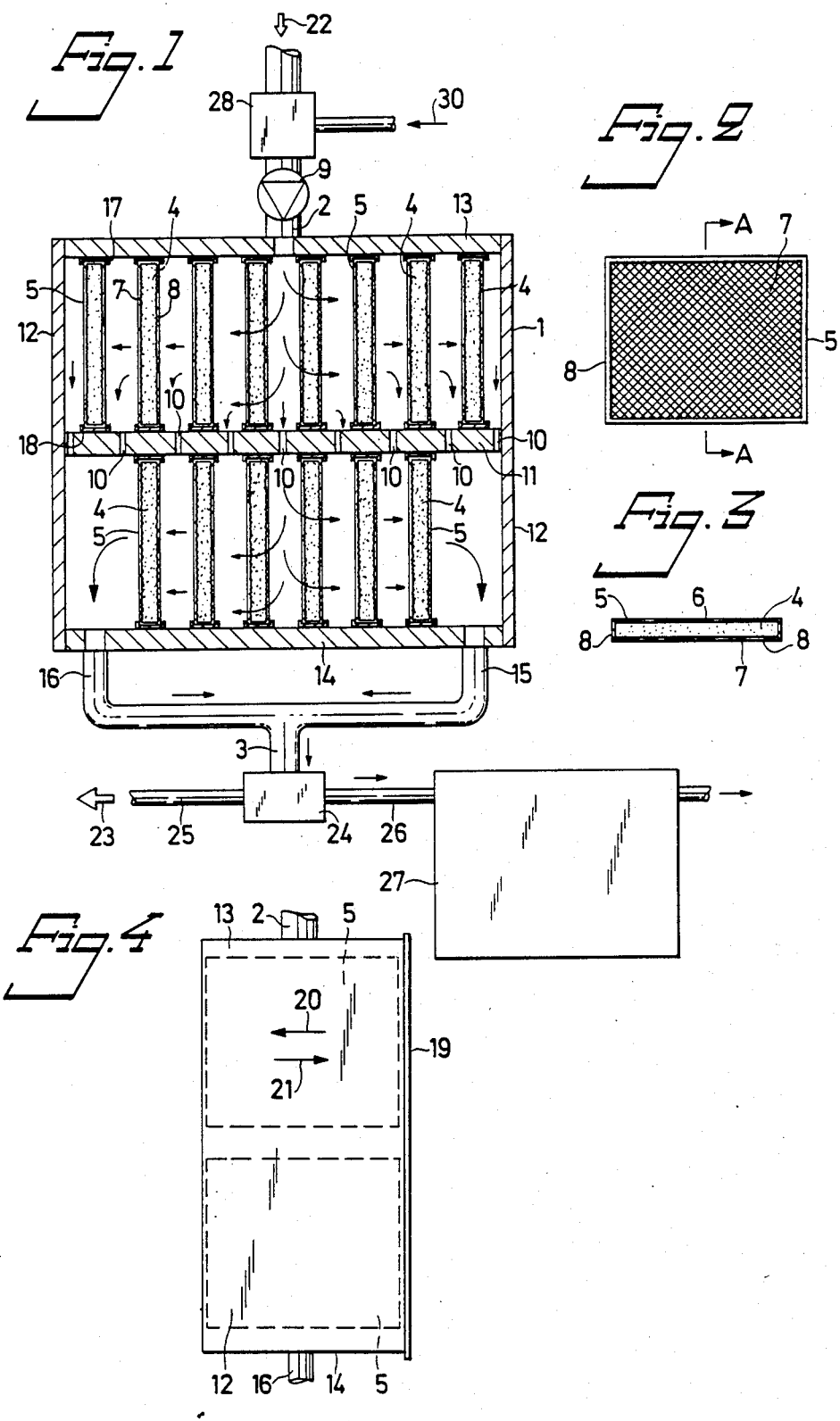

METHOD FOR CLEANSING METAL-CONTAINING SOLUTIONS

The present invention relates to a method for cleansing metal-containing solutions that are rich in salt, and apparatus herefor.

It is known that certain metals, primarily mercury, cadmium and lead, have a serious negative effect on different ecological systems. Consequently, it is necessary to find ways and means of extracting such deleterious substances from, inter alia, different types of flue gases and process water.

Swedish patent specification No. 440 608the corresponding U.S. Pat. No. 4,583,999 dated Apr. 22, 1986, Swedish patent application 860 2495-7 and Swedish patent application No. 860 2989-9 teach gas-cleansing methods in which, inter alia, mercury is extracted. According to these methods mercury, among other substances, is captured in an acid condensate, the mercury forming a chloride complex. Cadmium is also a substance which is extracted from flue gas in this way.

Mercury has a great tendency towards forming complexes in water with both organic and inorganic ligands. In order to extract mercury from a complex aqueous solution, it is necessary to add an agent with which the mercury present will form a still more stable compound. Inorganic and organic sulphides, such as TMT 15 or $Na_2S$, can both be used for this purpose. The resultant mercury sulphide precipitate, however, has an extremely fine granular form and is consequently difficult to separate.

The extent to which the metal sulphides can be extracted in practice is contingent on the efficiency of those parts of the cleansing process in which the metal precipitates are separated from the system. The results obtained hitherto from such systems indicate that the residual contents are normally so high as to require access to large water recipients in order not to create ecological effects.

The above applies both to water that has become contaminated when used in gas cleansing processes, and other industrial process water.

Consequently, one problem is to achieve a sufficiently high degree of separation or extraction of the mercury-containing metal precipitates.

Another problem resides in the very large volumes of water used in known cleansing systems. Consequently, it is desirable to be able to concentrate the mercury compounds so that they are present in a smaller volume of water prior to their final extraction from the system. The same applies to other metals, such as cadmium and lead.

These problems are solved by the present invention, which provides a simple method and simple apparatus for extracting mutually different metals, primarily mercury, cadmium and lead.

Accordingly, the present invention relates to a method for cleansing metal-containing solutions, particularly process water that contains metals such as mercury, cadmium and/or lead, where the metal concerned is in a water-solution form, such as the form of a chloride complex, the method being characterized by passing the solution through an ion-exchange material which consists essentially of sulfhydrated cellulose, said metals being adsorbed in the sulfhydrated cellulose; by regenerating said ion-exchange material subsequent to having adsorbed a given quantity of metal, wherein an aqueous solution containing hydrochloric acid (HCL) having a concentration of at least about 1 molar HCL is flushed or rinsed through said ion-exchange material; and by causing, in a known manner, the metal concerned to precipitate in a sulphide form from the liquid eluted from the ion-exchange material when rinsing said material.

The invention also relates to apparatus of the kind by which the aforementioned method may be practised, namely apparatus for cleansing metal-containing solutions, particularly, but not exclusively, process water which contains such metals as mercury, cadmium and/or lead, where the metals concerned are present in a water-soluble form, such as in a chloride complex form, and wherein the apparatus includes an ion-exchange column which is provided with an inlet pipe for contaminated liquid and an outlet pipe for cleansed liquid, and which contains an ion-exchange material which is comprised substantially a sulfhydrated cellulose.

The invention will now be described in more detail, partly with reference to an exemplifying embodiment of an apparatus illustrated in the accompanying drawing, in which FIG. 1 is a schematic cross-sectional view of an apparatus constructed in accordance with the invention;

FIG. 2 is a plan view of a cassette according to the invention;

FIG. 3 is a sectional view taken on the line A-A in FIG. 2; and

FIG. 4 is a side view of the central part of the apparatus illustrated in FIG. 1.

The present invention is particularly suited for the extraction of one or more of the metals mercury, cadmium, zinc and lead with the pertinent metal being in a water-soluble form. When the invention is used for cleansing flue gases, the metal concerned will normally have the form of a chloride complex.

According to the invention, an aqueous solution containing said complex is passed through an ion-exchange material which consists substantially of sulfhydrated cellulose.

The ion-exchange material is manufactured in the following manner. The starting material is cellulose ($C_6H_{12}O_6$), which may be either in loose fiber form or spun or otherwise shaped into a coherent structure.

The cellulose is required to be dry and is treated with a mixture of thioglycolic acid, acetic anhydride, acetic acid, concentrated sulphuric acid and de-ionized water. The mixture may contain, for example, 50ml thioglycolic acid ($HSCH_2CO_2H$) 35ml acetic anhydride (($CH_3CO)_2O$), 16ml acetic acid ($CH_3CO_2H$), 0.15ml sulphuric acid ($H_2SO_4$), and 5ml water for each 10g of cellulose present.

This solution is sieved through the cellulose for from 1 to 7 calendar days at a temperature of 40°-45° C.. The thus treated cellulose is then washed with de-ionized water and dried to dryness at 40°-45° C..

During this treatment, the acetic anhydride causes the OH-groups in the cellulose to be replaced with acetate groups. The thioglycolic acid causes the SH-groups present to substitute said acetate groups.

Sulfhydrated cellulose has the formula $C_6H_6(SH)_6$. When a metal, such as mercury for instance, comes into contact with the sulfhydrated cellulose, the mercury is bound to the SH-groups, with the mercury (Hg) replacing the hydrogen atom H.

In order to ensure the adsorption of mercury, the contaminated water charged to the ion-exchanger is brought to a pH higher than about 1, preferably to a pH of about 2. Such metals as zinc, cadmium, lead or copper are not adsorbed to any appreciable extent at this pH.

In order to adsorb these substances, the contaminated water charged to the ion-exchanger must have a pH in the region of or slightly higher than 3.

Generally speaking the ion-exchanger will adsorb different metals at different pH values. Since the aforementioned metals have merely been mentioned by way of example, it will be understood that the invention is not restricted to the extraction of just these metals, and neither is it restricted to contaminated water with just the aforesaid pH-values.

One of normal skill in this art is fully capable of adjusting the pH of the contaminated water to a level applicable to the metal or metals to be adsorbed, with the aid of conventional analysis techniques. According to the invention, the ion-exchange material is regenerated subsequent to having adsorbed a predetermined amount of metal. It can be mentioned by way of example that the ion-exchange material should be regenerated when 50–70g of mercury has been adsorbed for each 1000g of ion-exchange material The ion-exchange material is regenerated by rinsing the same with an aqueous solution that contains hydrochloric acid (HCl) at a concentration of at least 2 molar HCl. Alternatively, the concentration may be 1 molar HCl, but then in combination with about 2 molar of common salt (NaCl). The acid concentration may also be higher, e.g. 3 moles HCl.

The amount of regenerating solution required is about 2-4 bed volumes.

The regenerating process is effected so that at such high acid strengths, optionally in combination with a high proportion of salt, i.e. in the presence of other cations than $Hg^{2+}$, the mercury is displaced from its position at the locations of the sulphur (S) of the sulfhydrated cellulose and returns to solution while being replaced with hydrogen (H) at the same time. The ion-exchanger can then be re-used.

The metal concerned is then precipitated in sulphide form from the water eluted from the ion-exchange material when rinsing the same. This is achieved, for instance, by adding TMT 15 or $Na_2S$.

It may be convenient to filter the contaminated water through a bed of fine sand for example, prior to charging contaminated water to the ion-exchanger, in order to extract from the water substances suspended therein, and therewith prevent those substances from sludging-up the ion-exchange material.

A very high degree of metal extraction is achieved in the ion-exchanger when practicing the present invention.

Furthermore, subsequent to regenerating the ion-exchange material the extracted metals are concentrated in a volume of liquid which is relatively small when compared with the volume of liquid that has passed through the ion-exchanger.

The following facts can be mentioned by way of example.

Approximately 10kg of sulfhydrated cellulose are required to clean $100m^3$ of liquid used to cleanse flue gases of their mercury content in accordance with Swedish patent No. 440 608 (U.S. Pat. No. 4,583,999). A bed volume in this case may be 50 l. In order to regenerate such a bed, it is necessary to use 2-4 bed volumes of regenerating liquid, i.e. 100 l for example.

Thus the mercury contained in $100m^3$ of liquid has been concentrated to a liquid volume of 100 l, i.e. the mercury has been concentrated 1000 times.

As beforementioned, the invention also relates to apparatus for cleansing solutions which contain metals of the aforesaid kind.

One such apparatus is illustrated schematically in FIGS. 1–4. The apparatus includes an ion-exchange column 1, which is provided with an inlet pipe 2 for contaminated liquid and an outlet pipe 3 for cleansed liquid. The ion-exchange column contains an ion-exchange material 4, which is substantially comprised of sulfhydrated cellulose.

The ion-exchange material 4 is carried by one or more cassettes 5 which comprise two mutually parallel net structures 6, 7 which sandwich the ion-exchange material therebetween, thereby holding said material firmly in place, and which are in turn carried by a frame 8. The ion-exchange material is preferably spun or pressed to a mechanical strength sufficient for it to be retained by the net structures.

According to one preferred embodiment of the invention, the ion-exchange column includes a plurality of cassettes 5. The apparatus also includes devices for forcibly driving the contaminated liquid through the ion-exchange material in the cassettes 5. These devices include a pump 9, and also channels 10 which are so arranged that the contaminated liquid is forced to pass the ion-exchange material in order to be able to flow from the inlet 2 to the outlet 3.

For example, the ion-exchanger may have the construction illustrated in FIG. 1, in which a plurality of cassettes 5 are placed in mutual parallel relationship in two tiers mutually separated by a bearing frame 11. The cassettes 5 are placed in a surrounding casing 12 or housing, the linear extension of which perpendicular to the paper in FIG. 1 corresponds to the width of a cassette 5. The inlet pipe 2 is isolated centrally in the roof 13 of the housing, whereas two outlets 15, 16 are provided at the outer extremities of the housing floor 14. These outlets are joined in the outlet pipe 3. The carrier frame 11 incorporates the aforesaid channels 10. The diameter of these channels are adapted so as to provide a throttling effect such that subsequent to entering the ion-exchange column through the central inlet 2, the contaminated water is divided into flows which pass respectively horizontally through the cassettes in the upper cassette tier and through the channels 10 to the cassettes located in the lower cassette tier, as indicated by the arrows in FIG. 1. The liquid flowing through the channels 10 is forced outwards in the lower tier of cassettes, as indicated by the arrows, and then departs through the outlets 15, 16.

In the illustrated embodiment of the apparatus each cassette 5 is slideably mounted in a pair of upper and lower rails 17, 18 of U-shaped cross-section, the frames 8 surrounding the cassettes being guided in the rails at right angles to the plane of the paper in FIG. 1. This enables the cassettes to be changed quickly and easily.

FIG. 4 is a side view of the ion-exchange column and shows in broken lines one cassette 5 of the upper tier and one cassette 5 of the lower tier. One side 19 of the column is preferably removable so as to enable the cassettes to be inserted into and removed from the column in the respective directions of the arrows 20 and 21.

The ion-exchange column and the cassetees, inclusive of the net structures, are made of an acid-proof material, preferably a suitable plastics material.

The contaminated liquid is charged to the apparatus through the inlet 2, as indicated by the arrow 22, and then passes through the ion-exchange material.

The cleansed liquid exiting through the outlet 3 is conducted to one or more vessels (not shown), optionally to be cleansed of substances other than the metals extracted in the illustrated apparatus, prior to releasing the cleansed liquid to a water recipient, as indicated by the arrow 23.

A two-way valve 24 is arranged downstream of the outlet 3. Connected to the valve 24 is a discharge pipe 25 for cleansed liquid and a further discharge pipe 26 which discharges into a vessel 27.

A further two-way valve 28 is arranged upstream of the pump 9 and has connected thereto the inlet pipe 2 and a further pipe 29, through which regenerating liquid is passed as shown by the arrow 30.

When regenerating liquid is charged to the apparatus, the supply of contaminated liquid thereto is cut-off by the valve 28 and the regenerating liquid is pumped through the ion-exchange column and discharged, via the valve 24 and the pipe 26, to the vessel 27, where it is collected for precipitation of metals in the manner described above. The liquid is then taken from the vessel 27 and passed through a pipe 31 to a treatment vessel (not shown) for optional further treatment.

It is quite evident from the aforegoing that the present invention solves the two problems recited in the introduction.

It will be understood that the present invention is not restricted to the aforedescribed embodiment or mixtures and that these may be modified. Furthermore, the sulfhydrated cellulose may have a physical form other than that described.

The invention shall not therefore be considered limited to the aforedescribed embodiment, and it shall be understood that modifications can be made within the scope of the following claims.

We claim:

1. A method for cleansing metal-containing solutions, which comprise a fluid solution selected from the group consisting of water containing contaminates from contaminated flue gases and contaminated process water, said fluid solution containing at least one of the metals from the group consisting of mercury, cadmium, zinc and lead, the metals being present in water-soluble form, the method comprising: passing said solution through an ion-exchange material (4) which consists essentially of sulfhydrated cellulose, said metals being absorbed in the sulfhydrated cellulose; regenerating the ion-exchange material (4) subsequent to the absorption of a predetermined quantity of metal, by rinsing the ion-exchange material with an aqueous solution that contains hydrochloric acid at a concentration of at least about 1 molar HCl and precipitating the metals in sulphide form from the liquid that is eluted from the ion-exchange material in said rinsing process.

2. A method according to claim 1, wherein the solution which is treated contains mercury contaminated water, further comprising adjusting the pH of the contaminated fluid solution charged to the ion-exchange material to a value within the range of from about 1 to about 2, in order to extract mercury from said water.

3. A method according to claim 1, wherein the solution which is treated is a contaminated liquid solution, further comprising adjusting the pH of the contaminated liquid solution charged to the ion-exchange material to a value of at least 3.

4. A method according to claim 1, wherein the aqueous solution used to regenerate the ion-exchange material has a concentration of at least 2 molar HCl.

5. A method as defined in claim 1, 2, 3 or 4, wherein said water soluble form of said at least one metal selected from the group consisting of mercury, cadmium, zinc or lead is a chloride complex.

6. A method according to claim 1, wherein the aqueous solution used to regenerate the ion-exchange material has a concentration of at least 1 molar HCl and a concentration of about 2 molar of NaCl.

* * * * *